United States Patent [19]

Lubell

[11] Patent Number: 5,357,756
[45] Date of Patent: Oct. 25, 1994

[54] BIPOLAR PULSE FIELD FOR MAGNETIC REFRIGERATION

[75] Inventor: Martin S. Lubell, Oak Ridge, Tenn.

[73] Assignee: Martin Marietta Energy Systems, Inc., Oak Ridge, Tenn.

[21] Appl. No.: 125,277

[22] Filed: Sep. 23, 1993

[51] Int. Cl.$^5$ ............................................. F25B 21/00
[52] U.S. Cl. ...................................... 62/3.1; 505/891
[58] Field of Search ........................... 62/3.1; 505/891

[56] References Cited

U.S. PATENT DOCUMENTS

| | | | |
|---|---|---|---|
| 4,509,334 | 4/1985 | Nakagome et al. | 62/3.1 |
| 4,916,907 | 4/1990 | Munk et al. | 62/3.1 |
| 5,091,361 | 2/1992 | Hed | 62/3.1 |
| 5,156,003 | 10/1992 | Yoshiro et al. | 62/3.1 |
| 5,182,914 | 2/1993 | Barclay et al. | 62/3.1 |
| 5,209,068 | 5/1993 | Saji et al. | 62/3.1 |

*Primary Examiner*—Ronald C. Capossela
*Attorney, Agent, or Firm*—Edward A. Pennington; James M. Spicer; Harold W. Adams

[57] ABSTRACT

A magnetic refrigeration apparatus includes first and second steady state magnets, each having a field of substantially equal strength and opposite polarity, first and second bodies made of magnetocaloric material disposed respectively in the influence of the fields of the first and second steady state magnets, and a pulsed magnet, concentric with the first and second steady state magnets, and having a field which cycles between the fields of the first and second steady state magnets, thereby cyclically magnetizing and demagnetizing and thus heating and cooling the first and second bodies. Heat exchange apparatus of suitable design can be used to expose a working fluid to the first and second bodies of magnetocaloric material. A controller is provided to synchronize the flow of working fluid with the changing states of magnetization of the first and second bodies.

18 Claims, 1 Drawing Sheet

BIPOLAR PULSE FIELD FOR MAGNETIC REFRIGERATION

This invention was made with Government support under contract DE-AC05-840R21400 awarded by the U.S. Department of Energy to Martin Marietta Energy Systems, Inc. and the Government has certain rights in this invention.

FIELD OF THE INVENTION

The present invention relates generally to magnetic refrigerators which rely on the magnetocaloric effect of magnetic materials to effect temperature changes, and more specifically, to a refrigerator in which the magnetocaloric material is cycled by using a bipolar pulse field source. The pulse field source surround two coaxial, but not concentric, steady state magnets which are disposed within the pulse field magnet.

BACKGROUND OF THE INVENTION

The concept of the magnetic heat pump is based on the principle of magnetocaloric effect of magnetic materials, in which entropy, and therefore temperature, changes when a material is magnetized or demagnetized. When a magnetic material is in its natural (i.e., zero magnetic field) state, the magnetic dipoles in the material are in a relatively disordered state.

If a magnetic field is imposed upon the material, the dipoles align with the field and are transformed into an ordered state, and a decrease in entropy (corresponding to an increase in temperature) occurs. Conversely, if a magnetic material is suddenly demagnetized by being removed from a magnetic field, an increase in entropy and a corresponding decrease in temperature will occur.

The concept of magnetic cooling can be traced back to the 1920's, when Giauque and Debye independently proposed using the magnetocaloric effect of magnetic materials for refrigeration to produce ultra-low temperatures. Giauque used a method in which a paramagnetic salt was cooled to 3.5 K in a magnetic field and then demagnetized adiabatically to achieve 0.5 K. This adiabatic demagnetization method is a one-shot or single-step refrigeration process that does not provide continuous cooling. While failing to achieve wide-spread commercial application, the Giauque method is still being used in low-temperature physics experiments to create temperatures extremely close to absolute zero.

The possibility of building a heat pump using the magnetocaloric effect was believed to have been first suggested by J. G. Daunt and C. V. Heer in *Physics Review*, 76, 854 (1949), who combined two isothermal and two adiabatic magnetization and demagnetization processes to form a magnetic Carnot heat pump cycle that was capable of providing the sustained cooling. However, the laboratory experimentation was not performed until 1975, when Brown built and tested a reciprocating magnetic heat pump assembly using gadolinium as the working medium. Brown'w work was published in the *Journal of Applied Physics*, 47(8), 3674 (1976).

Like the magnetic properties of materials, the temperature change caused by the magnetocaloric effect is highly dependent upon a strong magnetic field. Strong fields created by superconducting magnets are often preferred and are probably necessary for many practical applications. The complexity and relatively high cost of the traditional superconducting magnets (which must be cooled by liquid helium) are among the factors that have affected interest in magnetic heat pump development. The discovery of high-temperature superconductivity shows promise for achieving not only higher magnetic fields than before but also for being a simpler and less costly option (which may be cooled by liquid nitrogen or gaseous helium, for example). The continued advancements made in developing new superconducting materials is expected to enhance the viability of magnetic heat pump technology as well.

FIG. 1 schematically represents one type of magnetic refrigeration apparatus 10 in which a magnetocaloric material 12 is disposed within a pulsed NbTi superconducting solenoidal magnet 14. Power source 16 creates a cycling magnetic field between 0 and 7 tesla. The material 12 is made of Gadolinium alloys and requires a pulse magnet with a rapid duty cycle (such as 10 cycles per minute) to as high a field as possible so that the Gadolinium material can be constantly magnetized and demagnetized rapidly. This permits a one second rise time for magnetizing the sample to 7 tesla, a two second flat top for heat exchange between the sample and working fluid, a one second discharge time and a two second hold time. For these requirements the limit on field is considered to be about 7 tesla for pulse superconducting magnets using a NbTi superconductor.

The arrangement of pulsed solenoid magnet and magnetocaloric sample described above has three disadvantages. First, the attainment of 8 tesla or higher field with pulsed superconducting magnets using a NbTi superconductor is not achievable in practice. Second, the magnetic energy on discharge (cycling) of the pulsed magnet is not recovered, thereby making the efficiency of the system very low. Lastly, the cycling rate from zero field to maximum field of 7 tesla is dependent on both the ability of the magnet to sustain large rates of change in a stable manner and on the rate at which the working fluid can be cooled down.

SUMMARY OF THE INVENTION

An object of the present invention is to provide a magnetic refrigeration apparatus which requires a smaller, less powerful pulse magnet.

Another object of the present invention is to provide a more efficient magnetic refrigeration apparatus in which energy losses on discharge of the magnet are avoided.

Another object of the present invention is to provide a magnetic refrigeration apparatus in which the rate at which the magnet can be charged is increased.

These and other objects of the invention are met by providing a magnetic refrigeration apparatus which includes first means for generating a steady state magnetic field of predetermined flux density, a first body of magnetocaloric material disposed within the influence of the magnetic field of the first means, second means for generating a steady state magnetic field of opposite polarity and substantially the same predetermined flux density as the first means, a second body of magnetocaloric material disposed within the influence of the magnetic field of the second means, and third means for generating an alternating current magnetic field cycling between substantially the same flux density as the first and second means, the first and second means being in the influence of the third means to thereby magnetically charge and discharge the first and second bodies of magnetocaloric material.

Other objects, advantages and salient features of the invention will become apparent from the following detailed description, which taken in conjunction with the annexed drawings, discloses preferred embodiments of the invention.

DETAILED DESCRIPTION OF THE INVENTION

Figure 2:
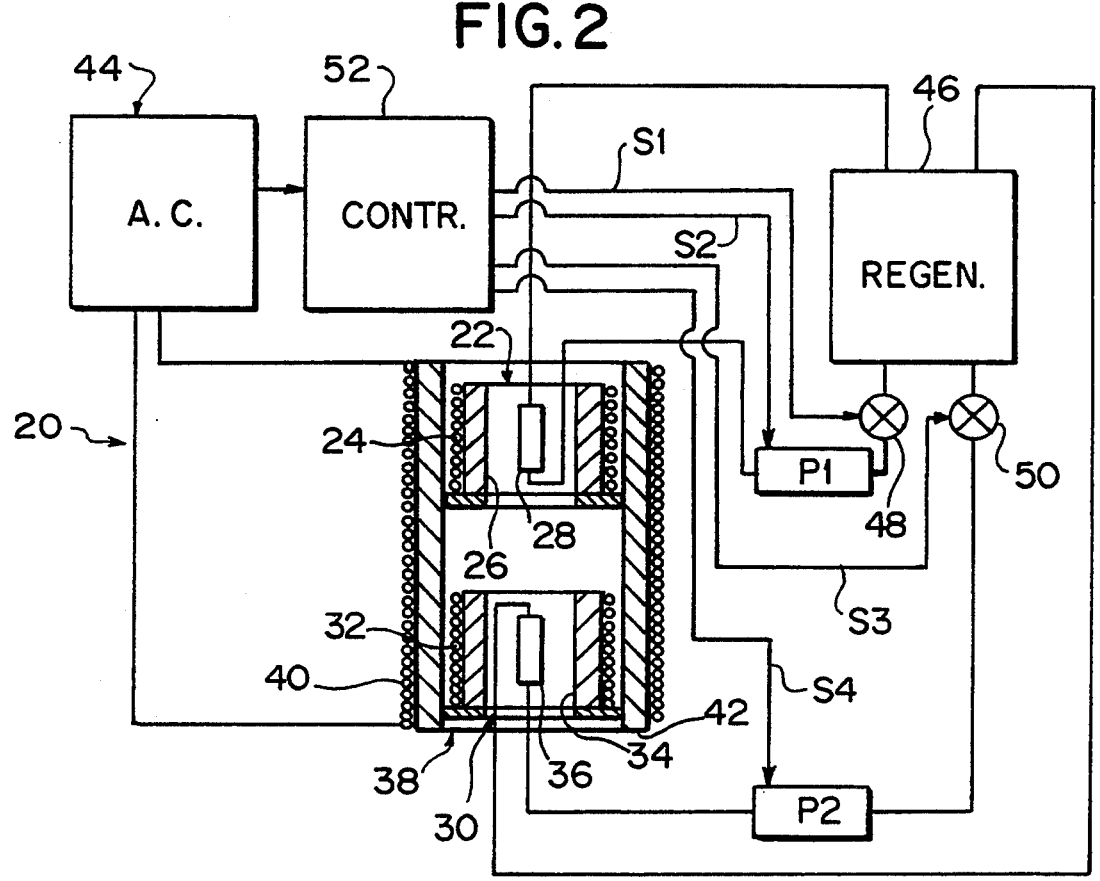
FIG. 2 is schematic view of, partially in vertical section, of a magnetic refrigeration apparatus according to a preferred embodiment of the present invention.

Referring to FIG. 2, a magnetic refrigeration apparatus 20 includes a first solenoidal magnet 22 which generates a preset steady state, axially oriented magnetic field having a flux density of +4 tesla. The magnet 22 includes a coil 24 wrapped around a non magnetic cylindrical sleeve 26. Preferably, the coil 24 is made of a superconductive material such as NbTi. Cooling means (not shown) may be provided for maintaining the coil 24 at the requisite temperature. The magnet 22 may operate in the "persistent" mode in which a direct current flowing through the coil 24 will continuous produce a magnetic field, after initial energizing, without need for a power source.

A body 28 made of magnetocaloric material is disposed within the magnet 22 and is axially aligned with the field generated by the magnet 22. The preferred magnetocaloric materials include Gadolinium alloys. The body 28 is shaped to provide heat exchange with a working fluid flowing through a heat exchange system to be described more fully below.

A second solenoidal magnet 30 is coaxial to, but not concentric with, the first solenoidal magnet 22 and generates a preset steady state, axially oriented magnetic field having a flux density of −4 tesla. The magnet 30 includes a coil 32 wrapped around a non magnetic cylindrical sleeve 34. Preferably, the coil 32 is made of a superconductive material such as NbTi. Cooling means (not shown) may be provided for maintaining the coil 32 at the requisite temperature. The magnet 32 may operate in the "persistent" mode in which a direct current flowing through the coil 32 will continuous produce a magnetic field, after initial energizing, without need for a power source. The two magnets 22 and 30 are arranged in a cusp or mirror disposition, where the fields are of substantially equal flux density but opposite polarity.

A body 36 made of magnetocaloric material is disposed within the magnet 30 and is axially aligned with the field generated by the magnet 30. The preferred magnetocaloric materials include Gadolinium alloys. The body 36 is shaped to provide heat exchange with a working fluid flowing through the heat exchange system which includes the other body 28.

A bipolar pulsed solenoidal magnet 38 includes a coil 40 wrapped around a non-magnetic cylindrical sleeve 42. Preferably, the coil 40 is made of a superconductive material such as NbTi. Cooling means (not shown) may be provided for maintaining the coil 32 at the requisite temperature. The coil 40 is coupled to a bipolar (alternating voltage) power source 44 capable of producing a pulsed, axially oriented magnetic field which cycles between +4 tesla and −4 tesla. The power source may be any commercially available source capable of field switching, and may include solid state bipolar power sources.

When the pulsed magnet is energized to a +4 tesla flux density the body 28 in the upper solenoidal magnet 22 is exposed to a field of +8 tesla (+4 from the upper magnet 22 and +4 from the outer pulsed magnet 38). While body 28 is thus fully magnetized, the lower body 36 is in a 0 tesla field, or completely demagnetized (−4 from the lower magnet 30 and +4 from the outer pulsed magnet 38). When the pulsed field is cycled to zero current and then charged in the opposite sense to −4 tesla, the body 28 is then discharged to a 0 tesla field while the lower body 36 is charged to −8 tesla. Thus, the two bodies 28 and 36 cycle between 0 and 8 tesla.

The working fluid in heat exchange with the two bodies 28 and 36 is synchronized with the state of magnetization of the bodies to extract the maximum lifting temperature. The means for effecting heat exchange and for synchronizing movement of working fluid with the cycling states of the magnetocaloric material will vary according to the specific application. As embodied, the heat exchange system includes a regenerator (regen.) 46 connected by fluid conduit to the two bodies 28 and 36. Solenoid actuated valves 48 and 50 control the flow of working fluid from the regenerator to the respective bodies 28 and 36. Pumps P1 and P2 provide the motive force for the working fluid. The pumps P1, P2 and valves 48, 50 are controlled by a controller (CONTR.) 52 which may include a timing circuit to issue control signals S1–S4 based on input from the bipolar power source 44. The controller may be programmed to issue control signals to the power source 44.

Figure 1:
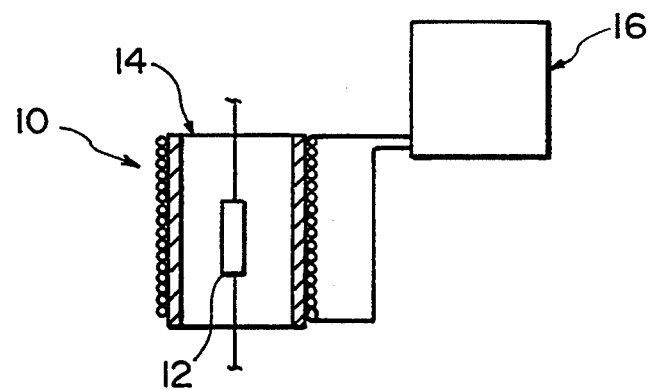
FIG. 1 is a schematic view, partially in vertical section, of a known magnetic refrigeration apparatus.

In order to increase the field according to the technique used in FIG. 1 current must be increased. When current is increased, pinning force must also increase and more dissipation is generated inside the superconducting material. Thus, while the apparatus of FIG. 1 is limited to 7 tesla, the present invention is capable of achieving 8 or 9 tesla since only the field need increase in the superconducting material.

One of the advantages to using the three-coil system using a bipolar pulsed magnet over a single superconducting pulse magnet is that the bipolar pulsed magnet only has to cycle between 0 and 4 tesla which is well within the state of the art with regard to losses and stability of the conductor. Therefore, a higher pulse field can be reached in a stable manner. The bipolar energizing presents no extra difficulty for the superconducting magnet. On the other hand the conductor of the steady state solenoidal magnets is subjected to a changing field of 4 or 4.5 tesla up to the operating point of 8 or 9 tesla. There will be losses in these magnets and they will need to be stabilized for maximum field conditions. However, this is easier to accomplish with NbTi conductor, since only field is changing and not current, then trying to produce a self field of 7 tesla with a pulsed magnet where both field and current are changing simultaneously.

Magnetic refrigerators (a type of magnetic heat pump) according to the present invention could be used for a variety of applications including, but not limited to, magnetic levitation (MAGLEV) vehicles, small superconducting energy storage (SMES) systems, motors and generators, and magnetohydrodynamic (MHD) propulsion systems.

It should also be noted that although the outer magnet is pulsed, the power system for the magnet is a dc one. The current for the magnet is not ac. It uses dc current but alternately directed through the magnet first in one direction and then the other through the change in voltage from + to −. This reverses the field direction from + to −. At the flat top the current is steady state and not changing, Other possible superconducting materials include low temperature material such as the compound Nb3Sn; high temperature Superconducting materials such as Bi-(2,2,2,3), Y-(1,2,3), T1-(2,2,2,3), T1-(1,2,1,2), T1-(1,2,2,3), PbBi-(2,2,2,3) and the newest Hg compounds.

Other possible magnetocaloric materials include gadolinium alloys (with Silicon, Aluminum, Nickel). Many alloys of rare earth metals are very good magnetocaloric materials in addition to gadolinium. Some examples are terbium, dysprosium, holmium, europium, erbium, and thulium and their alloys.

Although solenoid magnets are feature, the concept would also work with two steady state dipole magnets surrounded by a bipolar pulsed dipole magnet.

While advantageous embodiments have been chosen to illustrate the invention, it will be understood by those skilled in the art that various changes and modifications can be made therein without departing from the scope of the invention as defined in the appended claims.

What is claimed is:

1. A field source for a magnetic refrigeration apparatus, comprising:
   first means for generating a steady state magnetic field of predetermined flux density;
   a first body of magnetocaloric material disposed within the influence of the magnetic field of the first means;
   second means for generating a steady state magnetic field of opposite polarity and substantially the same predetermined flux density as the first means;
   a second body of magnetocaloric material disposed within the influence of the magnetic field of the second means; and
   third means for generating an alternating magnetic field cycling between substantially the same flux density as the first and second means,
   the first and second means being in the influence of the third means to thereby magnetically charge and discharge the first and second bodies of magnetocaloric material.

2. A field source according to claim 1, wherein the first and second means comprise first and second steady state solenoidal magnets disposed coaxial to each other.

3. A field source according to claim 2, wherein the third means comprises a bipolar pulsed solenoidal magnet, the first and second magnets being disposed concentrically within the bipolar pulsed magnet.

4. A field source according to claim 3, wherein each of the first, second and third magnets includes a coil made of superconductive material.

5. A field source according to claim 4, wherein the superconductive material is a NbTi superconductor 6. A field source according to claim 1, wherein the first and second bodies are made of Gadolinium.

7. A field source according to claim 1, wherein each of the first and second means includes a coil made of superconductive material, and each is operable in a persistent mode.

8. A field source according to claim 1, wherein the magnetic field density of the first means is +4 tesla, the magnetic field density of the second means is -4 tesla, and the magnetic field density of the third means cycles between −4 tesla and +4 tesla.

9. A field source for a magnetic refrigeration apparatus comprising:
   first and second steady state magnets, each having a field of substantially equal strength and opposite polarity;
   first and second bodies made of magnetocaloric material disposed respectively in the influence of the fields of the first and second steady state magnets;
   a pulsed magnet, concentric with the first and second steady state magnets, and having a field which cycles between the fields of the first and second steady state magnets, thereby cyclically magnetizing and demagnetizing and thus heating and cooling the first and second bodies.

10. A field source according to claim 9, wherein each of the first and second steady state magnets comprises a solenoidal magnet having a coil made of superconductive material.

11. A field source according to claim 10, wherein the first and second steady state magnets are operable in a persistent mode.

12. A field source according to claim 9, wherein the pulsed magnet comprises a solenoidal magnet having a coil made of superconductive material.

13. A field source according to claim 9, wherein the first and second bodies are made of Gadolinium.

14. A magnetic refrigeration apparatus comprising:
   first and second steady state magnets, each having a field of substantially equal strength and opposite polarity;
   first and second bodies made of magnetocaloric material disposed respectively in the influence of the fields of the first and second steady state magnets;
   a pulsed magnet, concentric with the first and second steady state magnets, and having a field which cycles between the fields of the first and second steady state magnets, thereby cyclically magnetizing and demagnetizing and thus heating and cooling the first and second bodies;
   heat exchange means for exposing a working fluid to the first and second bodies of magnetocaloric material; and
   control means for synchronizing the flow of working fluid with the changing states of magnetization of the first and second bodies.

15. A magnetic refrigeration apparatus according to claim 14, wherein each of the first and second steady state magnets comprises a solenoidal magnet having a coil made of superconductive material.

16. A magnetic refrigeration apparatus according to claim 15, wherein the first and second steady state magnets are operable in a persistent mode.

17. A magnetic refrigeration apparatus according to claim 14, wherein the pulsed magnet comprises a solenoidal magnet having a coil made of superconductive material.

18. A magnetic refrigeration apparatus according to claim 14, wherein the first and second bodies are made of Gadolinium.

* * * * *